United States Patent [19]

Kent et al.

[11] 4,273,667

[45] Jun. 16, 1981

[54] THERMAL ENERGY STORAGE MATERIAL COMPRISING HYDRATED COMPOUND AND WATER-SWOLLEN CROSS-LINKED POLYMER

[75] Inventors: Peter J. C. Kent, High Wycombe; John K. R. Page, Camberley, both of England

[73] Assignee: The Calor Group Limited

[21] Appl. No.: 125,263

[22] Filed: Feb. 27, 1980

Related U.S. Application Data

[63] Continuation-in-part of Ser. No. 88,514, Oct. 26, 1979, abandoned.

[30] Foreign Application Priority Data

Nov. 10, 1978 [GB] United Kingdom .............. 44117/78

[51] Int. Cl.$^3$ ................................................ C09K 5/06
[52] U.S. Cl. .................................... 252/70; 126/400; 165/104.11
[58] Field of Search ...................... 252/70; 126/400; 165/104 S, 104 M

[56] References Cited

U.S. PATENT DOCUMENTS

| | | | |
|---|---|---|---|
| 4,003,426 | 1/1977 | Best et al. ..................... | 165/104 S X |
| 4,111,189 | 9/1978 | Dizon ................................... | 252/70 |
| 4,209,413 | 6/1980 | Kent et al. ............................ | 252/70 |

OTHER PUBLICATIONS

"Conservation and Better Utilization of Electric Power by Means of Thermal Energy Storage and Solar Heating", Phase II—Prog. Report, No. NSF/RANN/SE/-GI27976/72/4, 12/31/72, pp. 6-3-6-15.

Chahroudi, "Suspension Media for Heat Storage Materials", Proc. of the Workshop on Solar Energy Subsystems for Heating/Cooling of Bldgs., Charlottesville, Va., Apr. 16-18, 1975, pp. 56-59.

Primary Examiner—Harris A. Pitlick

[57] ABSTRACT

The thermal energy storage material comprises at least one hydrated compound (such as an inorganic salt) having a reversible transition to the anhydrous or a less hydrated form and a hydrogel, comprising a water-swollen cross-linked polymer formed by cross-linking a synthetic hydrophilic polymer by a covalent cross-linking mechanism, throughout which the compound is dispersed. The hydrogel is made by reacting a water-soluble or water-dispersible synthetic hydrophilic polymer, which is preferably linear and thermoplastic, with a cross-linking agent therefor in an aqueous medium containing the hydrated compound. The hydrophilic polymer, the aqueous medium and the hydrated compound are used in such amounts that the storage material contains a major proportion, by weight, of the hydrated compound and a minor proportion, by weight, of the cross-linked polymer.

11 Claims, No Drawings

THERMAL ENERGY STORAGE MATERIAL COMPRISING HYDRATED COMPOUND AND WATER-SWOLLEN CROSS-LINKED POLYMER

This is a continuation in part of U.S. application Ser. No. 88,514 filed Oct. 26, 1979, now abandoned.

The present invention is concerned with thermal energy storage materials and heat-exchange devices containing such materials.

Thermal energy storage materials may store thermal energy as specific heat and/or as latent heat. It is often desirable to use materials which store thermal energy as latent heat, since this enables the volume occupied by the storage material to be minimised. This is advantageous, for example, in materials operating in the temperature range 10° C. to 100° C. for the storage of solar energy or of heat extracted during refrigeration.

Materials which are useful for the storage of thermal energy as latent heat undergo reversible transition from one form to another on heating to a characteristic transition temperature. This transition may be from solid phase to liquid phase (fusion) or from one crystal form to another (this latter transition also being referred to as fusion).

A number of hydrated compounds, such as inorganic salts, are known which undergo transition to the anhydrous or a less hydrated form at a characteristic temperature on heating and revert to the more hydrated form on cooling.

A potential drawback in the use of many of these hydrated compounds is incongruency of the phase transition, that is, the transformation of the low-temperature solid phase to a two-phase condition where a solid and liquid coexist. In the two-phase condition, the difference in densities of the two phases causes segregation thereof, which limits their ability to recombine and form the low-temperature single solid phase. Consequently the amount of heat recoverable on cooling is reduced.

Attempts can be made to avoid the formation of two phases above the transition point by controlling the initial composition of the material, but even for materials with a congruent phase transition, there remains the problem that the solid phase tends to settle out in time. This limits both the kinetics of transformation and the uniformity of energy storage density within a container, and results in deterioration of the material on repeated heating/cooling cycles.

Thermal energy storage materials have been proposed which consist of a suspension of a hydrated inorganic salt in an aqueous gel or thickened aqueous medium, the gelling or thickening agent being a natural organic polymer (or derivative thereof), a synthetic polymer or an inorganic thickening agent.

Examples of proposed natural polymer thickening agents are gelatine (see British Specification No. 1,543,336), starch, cross-linked starch or cellulose polymers (for first and third, see U.S. Pat. No. 3,986,969 and for second and third see the paper entitled "Suspension Media for Heat Storage Materials" by Day Chahroudi in Proceedings of the Workshop on Solar Energy Subsystems for the Heating and Cooling of Buildings, Charlottesville, Virginia, U.S.A., Apr. 16-18, 1975, pages 56-59) and alginates (see U.S. Pat. No. 3,986,969 and British Specification No. 1,298,674).

Examples of proposed synthetic polymer thickening agents are polyvinyl alcohol, polyacrylic acid or polyethylene oxide (see the Day Chahroudi paper already referred to).

Examples of proposed inorganic thickening agents are clays or diatomaceous earth (for the first see U.S. Pat. No. 3,986,969 and for both, see the Day Chahroudi paper), or fibrous materials, such as fibrous silicon oxide or magnesium oxide (see British Specification No. 1,298,674) or zeolites (see U.S. Pat. No. 3,720,198).

Of the above-mentioned proposed thickening agents, the natural polymers are unstable to hydrolysis and biodegradable, and these effects will considerably shorten the life of a material containing such a polymer. The above-mentioned synthetic polymers and inorganic thickening agents are more stable, but it appears that prior thermal energy storage materials containing such thickening agents can only be used in shallow depths (for example, about one inch) so that this dimensional limitation is imposed on heat exchange devices containing such storage materials and the device must be disposed with its major dimensions horizontal.

It has been proposed in European Patent Application No. 99 a thermal energy storage material in which a hydrated compound having a transition temperature to the anhydrous or a less hydrated form in the range 10° to 100° C. is dispersed and suspended in a hydrogel formed from a water-soluble synthetic polymer having a pendant carboxylic or sulphonic acid groups cross-linked with cations of a polyvalent metal.

Such a material need only contain a relatively minor amount of the polymer, preferably from 0.5 to 10% based on the weight of the material.

It is an object of the invention to provide a thermal energy storage material comprising a hydrated compound which material can be used in vertical columns of substantial height.

It is a further object of the invention to provide a thermal energy storage material which is stable to hydrolysis and biological breakdown.

It is still a further object of the invention to provide a thermal energy storage material which, in comparison with the storage material described in the above-mentioned European patent application No. 99, can be prepared in a more controlled manner, is even more stable at the upper end of the operating temperature range, and does not necessarily involve the use of heavy metal compounds in its preparation.

These and other objects are achieved according to the invention by the provision of a thermal energy storage material comprising a hydrated compound which has a reversible transition to the anhydrous or a less hydrated form, preferably at a temperature in the range 0° to 100° C., and a minor amount, such as 0.5 to 10% (based on the weight of the material), of a hydrogel throughout which the compound is dispersed, the hydrogel comprising a water-swollen cross-linked polymer formed by cross-linking a water-soluble or water-dispersible synthetic hydrophilic polymer by a covalent cross-linking mechanism.

According to another aspect of the invention there is provided a method of preparing such a thermal energy storage material in which a water-soluble synthetic hydrophilic thermoplastic addition polymer having a substantially linear carbon-carbon backbone and active hydrogen atoms in pendant groups thereof is reacted with a cross-linking agent therefor in an aqueous medium containing a hydrated compound which has a transition temperature to the anhydrous or a less hydrated form preferably in the range 0° to 100° C. (as mentioned above), so as to form a hydrogel comprising a water-swollen, covalently cross-linked polymer with said hydrated compound dispersed therein.

In one embodiment of the invention, the polymer may be cross-linked by an ionic cross-linking mechanism in addition to the covalent cross-linking mechanism. In this embodiment, ionic cross-linking is preferably effected by means of cations of a polyvalent metal, as described in the above-mentioned European Patent Application 99, the disclosure of which is incorporated herein by reference. The U.S. equivalent of this European application is Ser. No. 913351; the disclosure of this U.S. application is also incorporated herein.

There is disclosed in U.S. Pat. No. 4,003,426 a thermal energy storage material which comprises a cross-linked polymeric resinous matrix (such as a matrix of a resinous polyester or "vinyl ester" polymer or an epoxy resin) having a plurality of substantially unconnected small closed cavities disposed therein and a hydrated salt encapsulated therein. The amount of polymer included in such materials is disadvantageously high (that is, at least 25% by weight, usually at least 35% by weight). The presence of such a large amount of resinous polymer in the material means that the material has a disadvantageously low heat capacity per unit volume.

The material according to the invention, which has a structure similar to that of the material according to the above-mentioned European Patent Application (this structure being totally different to that of the material described in the above-mentioned U.S. Pat. No. 4,003,426) is generally formed in situ (that is, in an aqueous medium containing the hydrated compound) by reaction between the appropriate ingredients, generally the hydrophilic polymer and a separate cross-linking agent therefor, as indicated below.

One advantage of the material according to the invention is that there is minimal segregation in use (segregation would be expected after solidification of the hydrate phase by solid sinking to the bottom of the receptacle in which the material is disposed in use). There is no need to use the material according to the invention in flat horizontal trays; the material can be arranged in vertical columns of substantial height (for example, exceeding 50 cm).

A further advantage of the material according to the invention is that the cross-linked polymer forming the hydrogel can be prepared in situ by reaction between the appropriate ingredients as mentioned above.

A still further advantage of the material according to the invention is that, because the rate of cross-linking is temperature-dependent, it is possible to control the cross-linking reaction by the selection of appropriate ingredients for cross-linking and the use of appropriate temperature conditions during cross-linking.

Yet a further advantage of the material according to the invention is that the proportion of polymer is low, such as 0.1 to 10% more preferably from 2 to 3% (for example, about 5%), based on the weight of the material so that the material may have an advantageously high heat capacity per unit volume.

The water-soluble or water-dispersible hydrophilic polymer used to form the hydrogel is preferably thermoplastic and preferably an addition polymer containing a carbon-carbon backbone. The polymer is preferably substantially linear, but it may be slightly branched provided that the polymer remains at least water-dispersible, preferably water-soluble.

The polymer preferably has active hydrogen atoms (as determined by the Zerewitinoff method), such hydrogen atoms being present in, for example, hydroxy, carboxy or amide functional groups, as such groups help to make the polymer hydrophilic as well as providing sites for cross-linking. However, it is also possible for the hydrophilic groups and the cross-linking sites to be different (for example, the polymer may have hydrophilic functional groups as listed above and cross-linking sites, such as carbonyl groups).

In some cases, the polymer may have a cross-linking agent built into its structure (for example, when the polymer is poly-N-methylol acrylamide or poly-N-methylol methacrylamide). However, it is generally preferred, so that the commencement of cross-linking can be controlled, that a separate cross-linking agent be used, the cross-linking agent reacting with the appropriate functional groups in the polymer to effect cross-linking.

The temperature conditions may be chosen such that the cross-linking reaction proceeds at an acceptable rate. For example, where access to the receptacle in which the material is disposed in use is restricted, it is possible (and preferable) to premix the polymer, the cross-linking agent, the hydrated compound and any other desired materials (such as nucleating agents) in an aqueous medium in a convenient place, the premixed materials then being transferred to the receptacle by pumping or pouring, for example, before the cross-linking reaction has been completed. The temperature of the aqueous medium during this premixing stage is preferably in the range of 40° to 70° C.

When the polymer contains hydroxy functional groups, the cross-linking agent is preferably an aldehyde, a polyfunctional isocyanate (such as toluene diisocyanate) or a polyfunctional carboxylic acid (such as polyacrylic acid). Examples of suitable polymers containing hydroxy groups include polyvinyl alcohol, a hydroxyalkyl acrylate or methacrylate copolymer or homopolymer (such as a polymer of hydroxyethyl acrylate or hydroxyethyl methacrylate) or an ethylene oxide polymer.

When the polymer contains amide functional groups, it is preferably an acrylamide or methacrylamide polymer, such as a copolymer of acrylic or methacrylic acid with acrylamide or methacrylamide, partially hydrolysed polyacrylamide or polymethacrylamide, or an alkali metal or ammonium salt thereof. An example of a suitable cross-linking agent for such a polymer is an aldehyde.

Other suitable polymers containing amide groups are N-vinyl pyrrolidone polymers; such polymers can be cross-linked (via the carbonyl group) using cross-linking agents such as amines, hydroxyamines or hydrazine derivatives.

When the cross-linking agent is an aldehyde, it is preferably a lower aldehyde containing up to six carbon atoms, such as glutaraldehyde or, most preferably, formaldehyde.

When the polymer contains carboxy functional groups, it may be, for example, an acrylic acid, methacrylic acid, or itaconic acid polymer or a polymer of an itaconic acid half ester. Preferred polymers containing carboxy groups are copolymers of acrylic or methacrylic acid with acrylamide or methacrylamide, or partially hydrolysed polyacrylamide or polymethacrylamide, or an alkali metal or ammonium salt thereof, as mentioned above with reference to acrylamide and methacrylamide polymers.

Other suitable polymers containing carboxy groups are produced by solubilizing a maleic anhydride copolymer, such as a styrene-maleic anhydride copolymer.

In some embodiments, the polymer preferably contains 5 to 50% (for example 10 to 40%) carboxy groups, the percentage being based on the number of repeating units in the polymer backbone. In other embodiments, the polymer preferably contains 50 to 80% carboxy groups on the same basis in order that the polymer should be highly water-soluble.

When such a polymer containing carboxy groups is cross-linked via the carboxy groups, the cross-linking agent may be an amino resin (such as a ureaformaldehyde resin), a polyhydroxy compound (such as polyethylene glycol) or a polyamine.

Suitable hydrated compounds for use in the material according to the present invention include, for example, calcium chloride hexahydrate (the fusion point of which is 29° C.); sodium sulphate decahydrate (the fusion point of which is 32° C.); disodium hydrogen phosphate dodecahydrate (the fusion point of which is 35.5° C.); sodium thiosulphate pentahydrate (the fusion point of which is 50° C.); sodium acetate trihydrate (the fusion point of which is 58° C.); barium hydroxide octahydrate (the fusion point of which is 75° C.); zinc nitrate hexahydrate (the fusion point of which is 35° C.); potassium fluoride tetrahydrate (the fusion point of which is 18.5° C.); sodium carbonate decahydrate (the fusion point of which is 35° C.); lithium chlorate trihydrate (the fusion point of which is 8° C.) and eutectic mixtures of inorganic salts.

For the storage of solar energy, the hydrated compound preferably has a fusion point in the range 10° to 100° C., more preferably 20° to 90° C. and is preferably nontoxic, non-corrosive and readily available at low cost. Preferred hydrated compounds meeting some or all of the above requirements are cetain hydrated inorganic salts, such as sodium sulphate decahydrate, disodium hydrogen phosphate dodecahydrate, sodium thiosulphate pentahydrate, sodium carbonate decahydrate and calcium chloride hexahydrate.

Some of the above-mentioned hydrated compounds, when cooled below the fusion point thereof, tend to undergo supercooling (that is, they do not transform back to the hydrated form until the temperature is below the theoretical fusion point). This may result in less hydrated forms of the compound being formed, with consequent reduction in the amount of energy released. In order to avoid supercooling, the material may be nucleated, for example, by a heat-transfer method as disclosed in U.S. Pat. No. 2,677,243, by careful control of the proportions of the ingredients of the composition, or by addition of an insoluble nucleating agent. Sometimes the polymer forming the hydrogel may act as the nucleating agent. A preferred nucleating agent for sodium sulphate decahydrate is borax, as proposed in U.S. Pat. No. 2,677,664. Other suitable nucleating agents are disclosed in British Specification Nos. 1,500,245, 1,543,336 and 2,001,096 and German Offenlegungsschrift No. 2,550,106.

When a nucleating agent is present, this agent, like the hydrated compound, is dispersed and suspended in the hydrogel and effectively immobilized therein. This wide dispersion of immobilized nucleating agent ensures efficient nucleation of the hydrate phase during cooling cycles, thereby inhibiting supercooling.

The thermal energy storage material according to the invention preferably contains a hydrated compound in an amount of from 66 to 95% by weight and, optionally, a nucleating agent in an amount of from 1 to 10% based on the weight of the hydrated compound.

Substantially all the balance of the thermal energy storage material according to the invention is preferably water and, optionally, a dispersant which facilitates uniform and rapid solution of the polymer. Examples of such dispersants include certain organic liquids which are miscible with water. Particularly preferred such organic liquids are lower aliphatic alcohols, such as methanol or ethanol (for example, when the hydrated compound is sodium sulphate decahydrate). The water is preferably present in an amount sufficient to hydrate all the anhydrous form of the compound, and is preferably present in a small excess. The material may contain water in an amount of, for example, from 25 to 75% by weight. When a water-miscible organic liquid is included (for example when the polymer is not highly water-soluble, but only sparingly water-soluble or water-dispersible), it is preferably present in a relatively minor amount, compared with water, for example from 5 to 25% based on the weight of water.

The material according to the invention is preferably used in a method of heat exchange which comprises alternately heating the material to a temperature above the transition temperature of the hydated compound, and extracting heat from the material by passing a fluid at a temperature below the above-mentioned transition temperature in heat-exchange relationship therewith. The alternate heating and cooling of the material can be repeated fro many cycles. In use, the material is preferably retained in a receptacle of a gas—or vapour—barrier material.

The present invention also comprises a heat exchange device, which comprises a receptacle of a gas—or vapour-barrier material containing the thermal energy storage material according to the invention and means for supplying a cooling fluid in heat-exchange relationship with the thermal energy storage material.

In order that the invention may be more fully understood, the following Examples are given by way of illustration only.

EXAMPLE 1

80 g. of anhydrous sodium sulphate $Na_2SO_4$, 8 g. of borax $Na_2B_4O_7.10H_2O$ and 100 cm$^3$ of water were thoroughly mixed at above 40° C. to ensure that all undissolved sodium sulphate remained in the anhydrous state.

To the mixture were added 10 g of the sodium salt of a water-soluble acrylamide polymer containing acrylic acid units. The polymer, which had an average molecular weight of about 7.5 million and had a ratio of carboxyl: amide radicals of about 1:9, was a material commercially available from Allied Colloids Ltd. as WN23.

To the resulting mixture were added 5 cm$^3$ of formalin (an aqueous solution containing approximately 40% by weight formaldehyde and 14% by weight methanol), with stirring, followed by 15 cm$^3$ of methanol, with rapid stirring.

The viscosity of the mixture increased progressively to a uniformly thick but smooth consistency, and finally to a firm dry gel having a density of about 1.4 g/cm$^3$. The mixture contained no excess of water over that required to completely hydrate all the sodium sulphate; on cooling it fully transformed to a solid.

A sample of the solid was sealed in a circular polyethylene tube of 4½ cm diameter and 10 cm in length. The ends of the tube were sealed.

The tube was disposed vertically and alternately heated to about 60° C. (the heating time being about one hour) and cooled to about 20° C. by heat-exchanging with water circulating outside the tube (the cooling time being three to four hours). Reproducible thermal arrests, with no detectable segregation of the constituents, were obtained for more than 500 cycles of heating and cooling.

Another sample of the solid was held at 45° C. for a prolonged period; no segregation was detectable after over 500 hours at this temperature.

EXAMPLE 2

Example 1 was repeated, except that the polymer was replaced by the same amount of a non-ionic water-soluble acrylamide polymer which had an average molecular weight of 13 million and was commercially available from Allied Colloids Ltd. as W25.

In the thermal cycling test, reproducible thermal arrests were obtained for more than 500 cycles of heating and cooling. In the test in which the material was stored for a prolonged period at 45° C., no segregation was detected after over 500 hours.

EXAMPLE 3

80 g of anhydrous sodium sulphate $Na_2SO_4$, 8 g. of borax $Na_2B_4O_7.10H_2O$, 1.5 g. of aluminium sulphate $Al_2(SO_4)_3.14H_2O$ and 100 cm$^3$ of water were thoroughly mixed at above 40° C. to ensure that all undissolved sodium sulphate remained in the anhydrous state.

To the mixture were added 10 g. of the same polymer as used in Example 1.

To the resulting mixture were added 5 cm$^3$ of formalin, with stirring, followed by 17.5 cm$^3$ of methanol, with rapid stirring.

The resulting mixture, on cooling, fully transformed to a solid. A sample of the solid was sealed in a tube as in Example 1 and subjected to a thermal cycling test as in Example 1.

Reproducible thermal arrests were obtained for more than 500 cycles of heating and cooling.

Another sample of the solid was held at 45° C. for a prolonged period; no segregation was detectable after over 500 hours at this temperature.

EXAMPLE 4

300 g of anhydrous disodium hydrogen phosphate ($Na_2HPO_4$) were dissolved in 500 ml of water at a temperature of about 50° C. The solution was vigorously stirred while 50 g of an acrylamide polymer, available from Allied Colloids Ltd. as WN 33 was added. Stirring was continued as the mixture thickened.

After about 5 minutes, 50 ml of warm formalin were added to the mixture. The mixture gelled to a uniformly thick consistency and then transformed to a solid on cooling.

The polymer WN 33 differs from WN 23 used in Example 1 in that it has a higher ratio of carboxyl: amide radicals (the ratio is about 7:3 for WN 33) and a lower molecular weight (about 4.5 million).

The resulting gel, when used in the test described in Example 1, gave reproducible thermal arrests for many cycles.

EXAMPLE 5

Example 4 was repeated except that disodium hydrogen phosphate was replaced by 292 g of anhydrous sodium carbonate.

Similar results were obtained.

EXAMPLE 6

Example 4 was repeated, except that the polymer WN 33 was replaced by 60 g of polyvinyl alcohol, available from Monsanto under the Trade Mark Gelvatol 1-90 G.

Similar results were obtained.

Gelvatol 1-90 G contains less than 4% acetate groups and has a molecular weight of about 115,000.

EXAMPLE 7

11.76 kg. of anhydrous sodium sulphate were dissolved in 24.0 kg. of water at 70° C. in a PVC container, and then 0.47 liter of formalin was added to the solution. A pre-mixed powder containing 7.06 kg. of anhydrous sodium sulphate, 2.35 kg. borax and 4.17 kg. of the polymer identified in Example 4 as WN 33 were added gradually to the hot solution with rapid stirring using a motor-driven two-bladed impeller rotating at 1000 r.p.m. Stirring was continued for 60 seconds until the viscosity of the slurry increased sufficiently to prevent settling of suspended solids.

The resulting material was transferred to a strengthened tank, lined with welded polypropylene sheet, in which was located a parallel plate heat exchanger. The top of the tank was closed with a gasket/lid assembly fitted with a tube connected to the space above the storage material, to allow for expansion and contraction of the material while maintaining ambient pressure in the tank.

Reproducible thermal arrests were obtained for over 1000 cycles.

EXAMPLE 8

350 g of calcium chloride, 5 g of barium carbonate and 30 g of a linear polymer of molecular weight about 100,000 (prepared by polymerisation of hydroxyethyl methacrylate in an aqueous medium using ammonium persulphate as polymerisation initiator) were thoroughly mixed while adding 70 ml. of ethanol.

500 ml. of water (at 40° C.) were then added with vigorous agitation, followed by 50 ml. of formalin.

The resulting gel, when used in the thermal cycling test described in Example 1, gave reproducible thermal arrests for many cycles.

EXAMPLES 9 AND 10

Examples 1 and 6 were repeated, except that, in each case, the formalin was replaced by a corresponding amount of glutaraldehyde.

Similar results were obtained.

Similar results to those described in the above Examples can be obtained using as the polymer:

(i) an acrylic or methacrylic acid polymer (such as those available from Allied Colloids Ltd. as Versicol E or K), an itaconic acid (or half-ester) polymer, a methyl vinyl ether-maleic anhydride copolymer or a styrene-maleic anhydride copolymer (these polymers being cross-linked using, for example, an amino resin, a polyhydroxy compound, or a polyamine);

(ii) a vinyl pyrrolidone polymer (cross-linked using, for example, amines, hydroxy amines or hydrazines); or (iii) a polymer of N-methylol acrylamide or N-methylol methacrylamide (the latter being self-cross linking via the methylol groups).

What is claimed is:

1. In a thermal energy storage material which comprises at least one hydrated compound which has a reversible transition to the anhydrous or a less hydrated form and a minor amount of hydrogel throughout which said compound is dispersed, the improvement comprising that the hydrogel comprises a water-swollen cross-linked polymer formed by cross-linking a synthetic hydrophilic polymer by a covalent cross-linking mechanism.

2. A thermal energy storage material according to claim 1, wherein said synthetic hydrophilic polymer has functional groups selected from the group consisting of hydroxy, carboxy and amide groups, said functional groups being reacted with a cross-linking agent to form said cross-linked polymer.

3. A thermal energy storage material according to claim 1, wherein said synthetic hydrophilic polymer has groups which have been reacted with a cross-linking agent selected from the group consisting of an aldehyde, a polyfunctional isocyanate and a polyfunctional carboxylic acid.

4. A thermal energy storage material according to claim 3, wherein said synthetic hydrophilic polymer is selected from the group consisting of polyvinyl alcohol, a hydroxyalkyl acrylate polymer, a methacrylamide polymer, an acrylamide polymer and a hydroxyalkyl methacrylate polymer.

5. A thermal energy storage material as set forth in claim 3 in which the groups which have been reacted are hydroxy groups.

6. In a method of preparing a thermal energy storage material which comprises a hydrogel having dispersed therein a hydrated compound which has a transition temperature to the anhydrous or a less hydrated form in the range 0° to 100° C., the improvement comprising that the hydrogel is formed by reacting a water-soluble synthetic hydrophilic thermoplastic addition polymer having a substantially linear carbon-carbon backbone and active hydrogen atoms in pendant groups thereof with a cross-linking agent therefor in an aqueous medium containing said hydrated compound, such that the resulting hydrogel comprises a water-swollen, covalently cross-linked polymer.

7. A method according to claim 6, wherein said active hydrogen atoms are present in amide groups and said cross-linking agent is formaldehyde.

8. A method according to claim 6, wherein said polymer has pendant acid groups and wherein the reaction is carried out in the presence of a water-soluble salt of a polyvalent metal, such that the cross-linked polymer is cross-linked by cations of said polyvalent metal as well as by said cross-linking agent.

9. In a method of extracting heat by passing a fluid in heat-exchange relationship with a thermal energy storage material comprising at least one hydrated inorganic salt selected from the group consisting of sodium sulphate decahydrate, disodium hydrogen phosphate dodecahydrate, sodium thiosulphate pentahydrate, sodium carbonate decahydrate and calcium chloride hexahydrate and a minor amount of a hydrogel throughout which said salt is dispersed, the improvement comprising that the hydrogel comprises a water-swollen cross-linked polymer formed by cross-linking a water-soluble linear synthetic thermoplastic polymer by a covalent cross-linking mechanism.

10. A method according to claim 9, wherein said polymer contains acrylamide repeating units and acrylic acid repeating units.

11. A method according to claim 10, wherein said polymer has been cross-linked by means of formaldehyde.

* * * * *